Oct. 12, 1971  K. LEVY  3,611,590
VISUAL SYSTEM COMPUTER
Filed Sept. 5, 1968  7 Sheets-Sheet 1

KENNETH LEVY
INVENTOR

BY *[signature]*

HIS ATTORNEY

KENNETH LEVY
INVENTOR

BY *[signature]*
HIS ATTORNEY

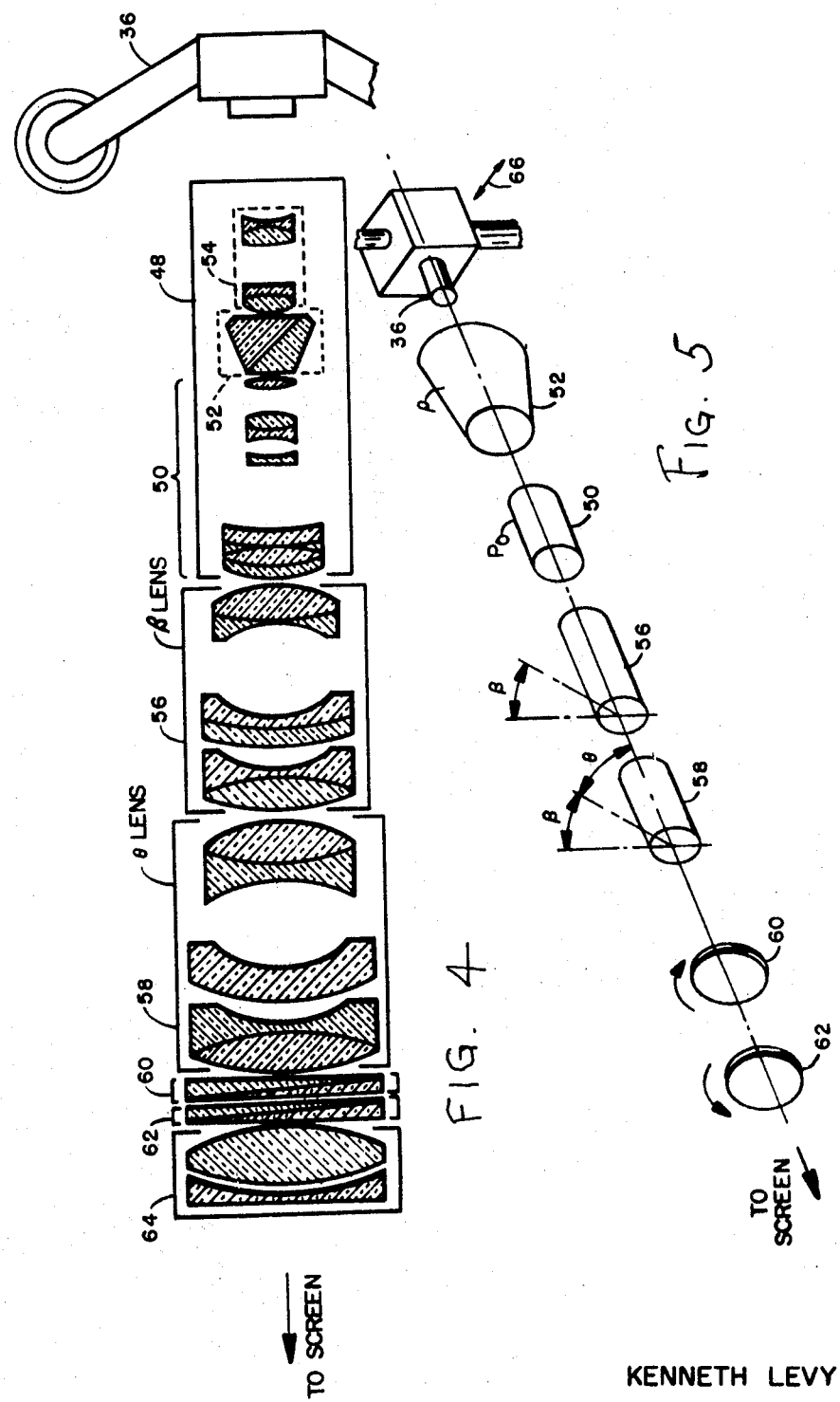

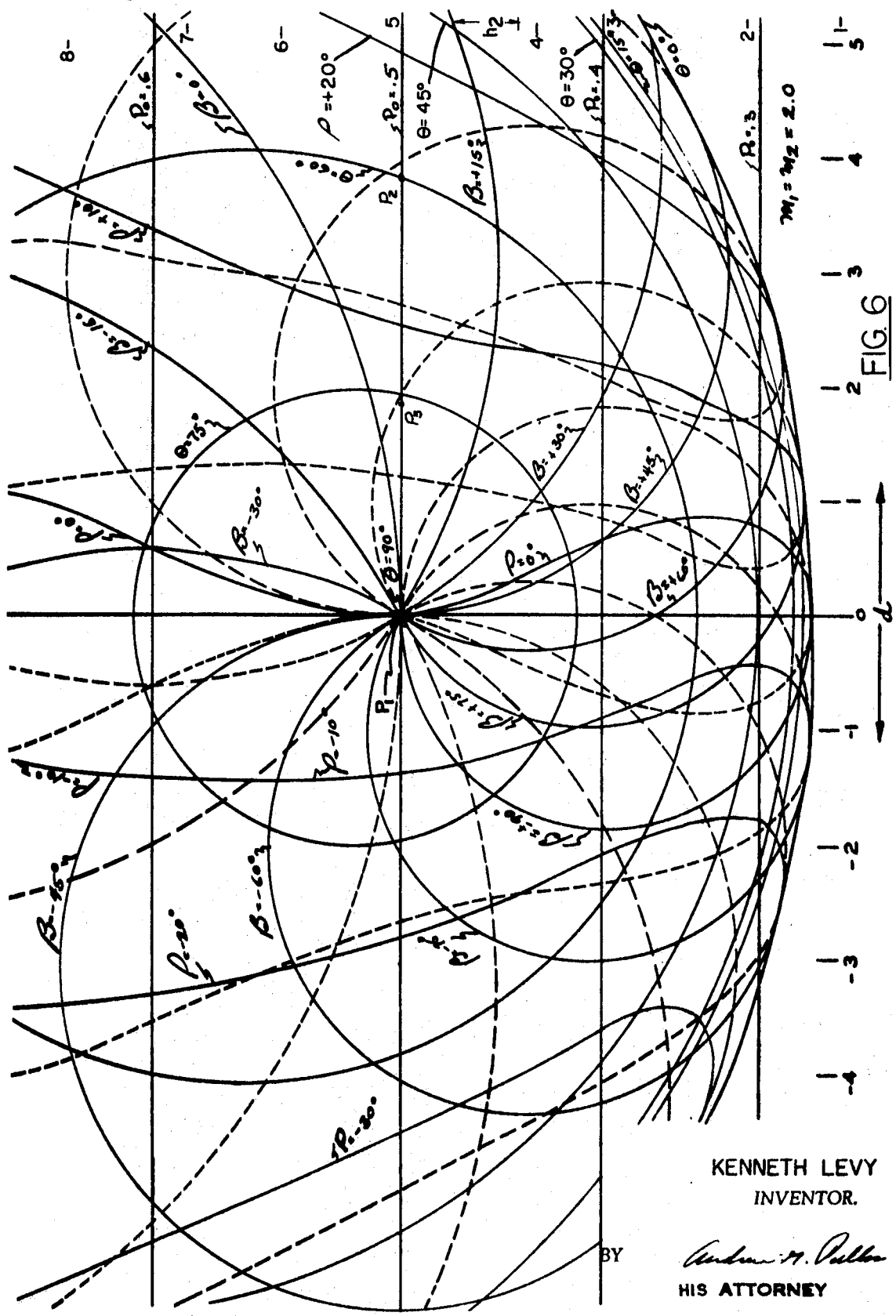

KENNETH LEVY
INVENTOR

Oct. 12, 1971 — K. LEVY — 3,611,590
VISUAL SYSTEM COMPUTER
Filed Sept. 5, 1968 — 7 Sheets-Sheet 7

KENNETH LEVY
INVENTOR

BY Andrew N. Pullos
HIS ATTORNEY

United States Patent Office 3,611,590
Patented Oct. 12, 1971

3,611,590
VISUAL SYSTEM COMPUTER
Kenneth Levy, Binghamton, N.Y., assignor to Singer-General Precision, Inc., Binghamton, N.Y.
Filed Sept. 5, 1968, Ser. No. 757,733
Int. Cl. G09b 9/08
U.S. Cl. 35—12 N                  8 Claims

ABSTRACT OF THE DISCLOSURE

The disclosed exemplification of the present invention is a method of and apparatus for increasing the limits of a simulated excursion which is permissible with the optical information of an object being viewed by the operator of a vehicle simulator. The method includes the steps of generating computed quantities which define the simulated position of the simulator, multiplying one of those quantities by a factor which varies in accordance with a quantity corresponding to range from a particular point, and distorting the viewed image of the object in accordance with the resultant quantity.

---

This invention relates generally to a visual system computer for a vehicle simulator, and more particularly to an improvement in combination with a simulator visual system which is a novel method of and apparatus for increasing the limits of the simulated excursion which is permissible with the optical information of the object being viewed by the operator of the simulator.

Visual systems are employed with vehicle simulators to present to the operator of the simulator various scenes which would be viewed along a typical vehicular path which is to be visually simulated. A well known and accepted visual system is one which employs a motion picture which contains scenes taken from a vehicle following a typical path, such as an airplane following a well defined approach path to a landing strip. The recorded scenes on the motion picture frames are distorted by the optics of the visual system in accordance with the simulated excursions of the simulator from the actual viewpoint of the recorded scenes. Such an optical system for altering the apparent perspective of an image is disclosed in U.S. Pat. No. 3,015,988.

The visual system disclosed in that patent alters the apparent perspective of an image by performing two primitive transformations by means of two anamorphic lenses having their axes of magnification rotatable with respect to one another, a zoom lens which compensates for the magnification of the image by the anamorphic lenses, and an image rotator for correcting the rotation of the image produced by the anamorphic lenses. This type of perspective alteration optical system can produce an apparent change in the perspective of an image within prescribed limits.

More particularly, the visual system disclosed in the prior mentioned patent and other similar visual systems preferably employs a motion picture projector which displays scenes recorded on a motion picture film through distortion optics onto a screen. If the optical information which is projected from a particular recorded scene is distorted in a prescribed fashion, a change in the apparent perspective of the image is realized. For example, if the image is stretched vertically while maintaining a constant window area for viewing by an operator, the visual impression realized by the operator will be that of a vertical excursion with respect to the recorded scene. On the other hand, if the picture is sheared while maintaining the horizon fixed and a constant window area, the visual impression realized by the operator will be that of a horizontal excursion with respect to the recorded scene. It is to be understood, of course, that the window area through which the image on the screen is viewed by the operator is smaller than the projected image so that the stretched and sheared edges of the image will not be viewed by the operator. It can be readily appreciated that an excursion having both vertical and horizontal components can be simulated by simultaneous distortion in both directions.

The amount of permissible vertical stretching, thus vertical excursion, is defined or limited in the above described visual system by the total maximum magnification of both anamorphic lenses. The total magnification also determines the amount of shear which can be produced by the system. For example, if each anamorphic lens has a power of two and the zoom lens has a power of four, the apparent viewpoint of an operator can be increased to an altitude of four times the altitude of the original viewpoint, which is the point at which the scene was originally recorded, and decreased to an altitude of one-fourth the altitude of the original viewpoint. In addition, the total permissible horizontal displacement is approximately equal to three and three-fourths the altitude of the original viewpoint. The limits of the possible visual excursions permissible with such a system, therefore, is a circle in the plane of the recorded scene having a diameter equal to three and three-fourths the altitude of the original viewpoint and having the lowest point thereof, which is the limit of vertical excursion toward the earth, spaced a distance of one-fourth the altitude of the original viewpoint above the surface of the earth. Therefore, if a particular flight mission is recorded at an altitude of 500 feet, such as may be required of a military mission, the permissible lateral displacement or visual excursion at the altitude of the original viewpoint is only 1500 feet, and the maximum permissible lateral displacement, which is at an altitude of two and one-eighth the altitude of the original viewpoint or, which is equal to 1062.5 feet, is 1875 feet. Consequently, if the student pilot is controlling the simulator to simulate a flight path at the altitude of the original viewpoint, the maximum possible lateral excursion to either side thereof is only 750 feet.

It can be readily appreciated that such limitations present a serious problem to the successful training of a student pilot, particularly of a military aircraft which is capable of maneuvering through such a lateral displacement as 750 feet within a relatively short time period. If the limitations of a visual system are exceeded, either the student pilot will observe the edges of the image within the window or some means must be provided, such as simulated fog, which will obscure the image at or near those limits.

As indicated hereinbefore, the limits of the visual system are defined by the powers of the distortion optics. Therefore, it would appear that the limits of the visual system could be expanded by simply increasing the powers of the distortion optics. However, this conclusion is based on a record of limitless size since in practice the recorded scene contains a limited amount of information. Therefore, the powers of the distortion optics are limited by the size of the recorded scene or the total information content thereof. Furthermore, if heading, pitch, or roll must be simulated at or near the limits of the visual system, some picture content must be reserved for such functions which subtracts from the total picture information available for permitting a lateral or vertical excursion. Therefore, the translational visual excursions of the visual system are defined in part by the total information available in a single frame of a motion picture film and in part by the requirements for rotational visual excursions at the limits of the translational excursions. Consequently, any type of distortion optics employed in conjunction with a recorded scene, such as a single frame of a motion picture film, will suffer the same difficulties of having limited lateral excursion at relatively low altitudes. The information content of a particular recorded scene is directly proportional to the altitude of the original viewpoint. Therefore, since the envelope of the visual system is determined by the information content or size of the recorded scene, the envelope is directly proportional to the altitude of the original viewpoint. If a relatively long flight mission is to be simulated at any altitude, and since the maximum permissible lateral excursion on each side of the original viewpoint and at the altitude of the original viewpoint is one and one half the altitude of the original viewpoint, it is possible for the student pilot to deviate from the photographed flight path outside the envelope of the visual system. For example, if a flight mission of several hundred miles is to be simulated at an altitude of 5,000 feet, the maximum excursion permissible on each side of the original viewpoint is 7,500 feet which is approximately 0.75% of the total flight path. Therefore, any slight error in heading, which may result for example from a component of wind introduced into the velocity equations of the flight of the simulator, which is not compensated by the student pilot will result in the envelope of the visual system being exceeded. In a military type of mission where the pilot is required to depend upon landmarks and instruments, such a deviation which will result in the envelope of the visual system being exceeded is extremely likely to occur. Unfortunately, landmarks on many military missions may be widely spaced from one another. If the limits of the visual system are exceeded, conventional techniques for blanking the view of the pilot in order to maintain some degree of realism may not always be realistic. For example, a flight mission over a desert region could not realistically employ a simulated fog when the limits of the visual system are exceeded. Therefore, a very real problem exists in the use of the above described type of visual system for a flight simulator when employed under special circumstances and for particular flight missions which may increase the chances of having the limits of the visual system exceeded.

Various solutions have been proposed for overcoming this problem, but each has shortcomings which tend to obviate the advantage realized. For example, it is possible to employ a scene which is recorded at a greater altitude than the altitude of the simulated flight, select a smaller area of that scene for display, and magnify with a slight trapezoidal distortion the selected area to correspond in size to the window viewed by the student pilot. Unfortunately, this arrangement seriously decreases the resolution of the displayed image and adds considerably to the cost of the system. It may be possible to sacrifice resolution over certain portions of the flight mission where less discernable objects are being presented in the displayed image. However, a visual system which is capable of changing the selected area of a recorded scene for display and changing the trapezoidal distortion of the resultant image during the display of a continuous sequence of scenes is extremely costly and complicated, requiring a large number of additional components. Such a visual system does not obviate the disadvantage of decreased resolution, which is one of the most critical factors in presenting a visual display. Furthermore, such a system imposes relatively high demands on the motion picture projector, since the speed of the film must be capable of being varied through a large range of speeds as the size of the selected area of the recorded scene is altered. Without such a capability, the speed of the film is directly proportional to the computed speed of the simulator. Therefore, the variation in speed of the film is directly proportional to the variation in the computed speed of the simulator. If different areas of the recorded scene must be selected, however, the speed of the film must be capable of such change which will permit such capability. For example, if a smaller area of a first recorded scene is selected and magnified with trapezoidal distortion immediately following display of a larger area of a second recorded scene in a particular sequence, the first selected scene must be one which at a greater ground range from the end of the mission than the second recorded scene. Therefore, the projector must operate in reverse. In actual practice, the change can be gradual and reversal of the projector may not be necessary, but the speed of the film must be capable of varying considerably more than the variation in the computed speed of the simulator. This requirement not only imposes severe limitations on the projector, but seriously affects the life of the projector and the film.

If a flight mission incorporates a particular sequence which requires the presentation of discernible structures and objects, having distinct geometric shapes, the visual excursion provided by the visual system cannot differ from the computed displacement of the simulator without giving the visual impression that the simulated displacement of the simulator is incorrect. However, when such discernable features are not being presented to the operator of the simulator, and if the apparent displacement of the visual system can be expanded, the disparity between the visual excursion and the computed displacement of the simulator will not be apparent. Therefore, if it is possible to expand the envelope of the visual system, such expansion will not degrade the training capability since the requirements for maintaining the correct perspective of less discernible objects, such as prairie lands, sand dunes, and mountains, is relaxed. That is, if such less discernible objects are distorted such that the distorted image is in correct perspective for a particular viewpoint, but not the viewpoint of the simulated position of the simulator, the operator of the simulator will not be able to detect a small difference in viewpoint or a small difference in the apparent perspective of the image. The image presented to the operator, however, will be in correct perspective for a particular viewpoint and the net effect will be that of having a visual viewpoint or position which is spaced from the computed position of the simulator. For example, if the controls of a simulator are operated to effect a simulated change of distance laterally with respect to the recorded flight path, the visual change in perspective will be some factor less than unity of that simulated change. If the viewed terrain does not contain any readily discernible objects, this difference between the simulated change in position of the simulator and the visual change in position will not be recognizable.

As described hereinabove, the envelope of the visual system is defined by the information content of the recorded scenes, the size of the selected area of those scenes for display, and the magnification of the distortion optics and the projection optics. Therefore, it would appear that the only method available for increasing the limits of the visual system is to vary one of the above mentioned factors. However, variation of any of these factors in order to increase the limits of the visual system would decrease one other characteristic of the system, such as resolution, which may not be desired. Such a compromise will add to one characteristic while detracting from another. Therefore, the present invention proposes a solution of the problem without compromising any of the other requirements of the visual system.

In a simulated mission which includes a simulated flight path over a considerable amount of terrain which does not contain readily discernible objects, the limits or envelope of the visual system are expanded in accordance with the principles of the present invention until a point is reached where more discernible objects are presented by the visual system to the operator of the simulator. For instance, if the simulator is employed to train pilots for warfare, a particular mission may, for example, include flight over desert regions to an output for the purpose of strafing or dropping explosives thereon. In such a flight mission, and in accordance with the principles of the present invention, the envelope of the visual system is expanded during the simulated flight over the desert regions until the discernible features of the outpost come into view, at which time the envelope of the visual system is gradually decreased along the simulated flight path toward the discernible object until the expanded envelope of the visual system is reduced to its original size. As a result, the student pilot will have an apparent lateral displacement from the flight path which is greater than the normal limits of the visual system during flight over terrain containing less discernible objects.

As the flight path progresses towards and approaches the target, the student pilot will have the target, which will be a more discernible object, as a reference point. With such a reference point being presented to the student pilot, any change in the simulated position of the aircraft simulator must be more compatible with changes in the apparent perspective of the image. If the discernible object appears to be at a relatively great distance from the viewpoint of the student pilot, relatively large differences can exist between the simulated change in the position of the simulator and the change in the apparent perspective of the image presented to the student. However, as the apparent distance to the more discernible object is reduced, this difference between the simulated displacement of the simulator and the apparent perspective of the image is reduced by reducing the expanded envelope of the visual system to its actual size.

In the above described mission, and in accordance with the principles of the present invention the envelope of the visual system is expanded in accordance with the range of the simulator from the target. If, for example, the sequence of recorded scenes begins at a known range from the target, a quantity commensurate with range is computed and employed to control the expansion of the visual system envelope. However, and in accordance with another embodiment of the present invention, it may be desirable in certain types of simulated missions to program the expansion of the visual envelope. For instance, in a simulated mission which presents to the student a plurality of scenes having several more discernible objects at spaced distances within the sequence of scenes, it is more desirable to program the expansion of the visual envelope such that the envelope will be expanded during simulated flight between the objects and reduced to its actual size during simulated flight in the immediate vicinity of the objects.

Accordingly, it is an object of the present invention to provide a method of and apparatus for increasing the limits of a simulated excursion of a visual system for a vehicle simulator.

It is another object of the present invention to provide a method of and apparatus for altering the limits of a simulated excursion of a visual system for a vehicle simulator in accordance with the type of objects included within the scenes presented by the visual system.

It is another object of the present invention to provide a method of and apparatus for altering the limits of a simulated excursion of a visual system for a vehicle simulator in accordance with the apparent range of the more discernible objects within the scene being presented by the visual system.

Still another object of the present invention is to provide a method of and apparatus for increasing the lateral excursion permissible with a visual system which employs a motion picture film recorded at a relatively low altitude.

These and other objects are realized by the present invention which generally includes the method of and apparatus for generating computed quantities which define the simulated position of the simulator, multiplying one of those quantities by a predetermined factor, and distorting the viewed image of the object in accordance with the multiplied quantity.

A feature of the present invention resides in the provision of the method of and apparatus for varying the multiplier factor in accordance with a quantity corresponding to the range of the viewpoint of the scene from a particular point. The present invention accordingly provides the distinct advantage of increasing the apparent displacement capabilities within the limits defined by a visual system associated with a vehicle simulator.

These and other objects, features and advantages of the present invention will be more fully realized and understood from the following detailed description when taken in conjunction with the accompanying drawings wherein:

FIG. 4 is a diagrammatic illustration of the optical system employed in the visual system illustrated in FIG. 3;

FIG. 5 is a diagrammatic illustration of the optical system illustrated in FIG. 4 showing the various functions and relationships of the elements therein;

FIG. 6 is a graph of the positional relationship of several of the elements of the optical system illustrated in FIG. 4 with respect to the simulated viewpoint of an image projected by the optical system;

Like reference numerals throughout the various views of the drawings are intended to designate the same or similar structures.

Figure 1:
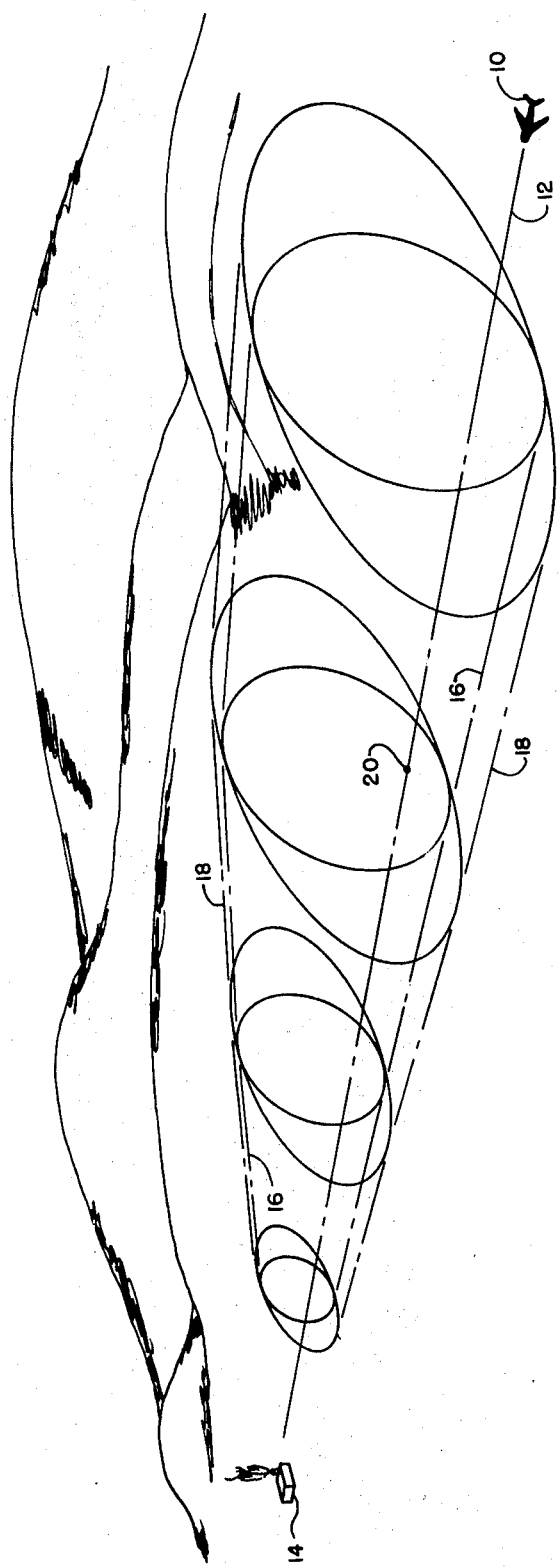
FIG. 1 is a diagrammatic view of the flight path of a camera airplane and the associated envelope defining the maximum excursions of a visual system in a simulated airplane which simulates the same flight;
which simulates the same flight.

With reference to FIG. 1, there is shown an airplane 10 which is following a predetermined flight path 12 toward a target 14. If it is desired to visually simulate a flight path similar to the flight path 12 a motion picture camera (not shown) is mounted on the airplane 10 and a plurality of scenes are recorded approximately at the rate of twenty-four frames per second. The developed motion picture film is then employed with a grounded airplane simulator, such as the type illustrated in FIG. 3, to provide a motion picture presentation of scenes as viewed from the airplane 10 proceeding along the flight path 12. However, since a student pilot cannot effectively follow the identical flight path 12 the visual system for displaying the motion picture presentation must be capable of distorting the image to simulate excursions from that flight path.

An optical system for altering the apparent perspective of an image, which is described in U.S. Pat. 3,015,988, permits excursions of the simulated aircraft from the flight path to the limits shown by the phantom lines designated with the reference numeral 16. The recorded scenes on the motion picture frames are distorted by the optics of the visual system in accordance with the simulated excursions of the simulator from the actual viewpoint of the recorded scenes. The lines 16, therefore, define the envelope of the perspective alteration capabilities of the optical system employed in conjunction with the motion picture projector on the aircraft simulator.

The sequence of scenes recorded along the flight path 12 will include a large number of scenes in which the target 14 will not be visible. If the terrain which can be viewed from the flight path 12 does not contain any discernible structures and objects having distinct geometric shapes, the limits of the visual system can be expanded without developing the visual impression that the simulated displacement of the simulator is incorrect with respect to the change in viewpoint. The expanded envelope of the visual system is illustrated in FIG. 1 by the phantom lines designated with the reference numeral 18.

As the motion picture presentation progresses, the recorded scenes will contain an image of the target 14 which will provide a visual reference point for the operator of the simulator. If it is assumed that the target 14 becomes discernible at a point 20 along the flight path 12 it will be necessary to reduce the envelope 18 as the simulated flight path progresses from the point 20 toward the target 14. However, since the target 14 will appear to be at a relatively great distance within the scene recorded at the point 20, it is not necessary to immediately reduce the envelope 18 at that point to the size of the envelope 16. If the target 14 appears to be a relatively great distance from the viewpoint of the operator, simulated changes in the displacement of the vehicle will subtend a relatively small angle with respect to the visual size of the target 14. Consequently, the size of the envelope 18 need not be reduced to the size of the envelope 16 until a point is reached in the simulated flight of the aircraft at which the target 14 fills a substantial area of the scene recorded at that point. As the target 14 fills a greater area of the recorded scene, the operator of the simulator is presented a better reference for visually sensing any change in the simulated displacement of the vehicle.

Figure 2:
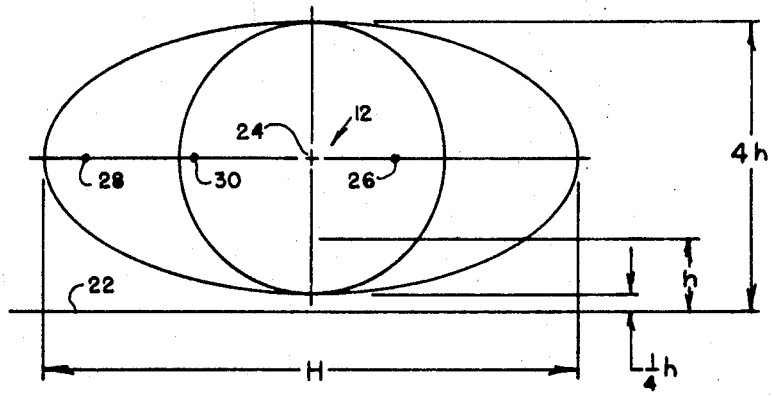
FIG. 2 is a graphic representation of a cross section of an envelope defining the maximum excursions permissible with a particular visual system and the expanded limits of that envelope achieved in accordance with the principles of the present invention.

The cross section of the envelopes 16 and 18 is illustrated in FIG. 2, with respect to the original viewpoints of the recorded scenes, and with respect to the ground. As shown therein, the scenes are recorded at an altitude $h$ above ground level, which is designated with reference numeral 22. The lowermost point in the envelope 16 is at approximately one-fourth of the altitude $h$ and the envelope 16 is a circle having a diameter approximately equal to three and three-fourths times $h$.

If an aircraft simulator is provided with a visual system, such as that described in U.S. Pat. 3,015,988 or that described herein below in conjunction with FIGS. 4 and 5 and the operator of the simultator has the controls thereof in such a position so as to simulate a flight path identical with the flight path 12 no distortion will be produced in the image presented by the visual system to the operator and the operator's viewpoint with respect to the displayed image will be the same as the viewpoint of the camera mounted on the airplane 10. With respect to the graphical representation illustrated in FIG. 2, the operator of the simulator will appear to be positioned at a point designated with the reference number 24 on the flight path 12. If the controls of the simulator are operated to simulate a lateral displacement from the point 24 to a point 26, the visual system will react accordingly to alter the apparent perspective of the image viewed by the operator so that the operator's viewpoint with respect thereto will appear to be located at the point 26. However, if the envelope of the visual system is expanded to the limits defined by the phantom line 18, a simulated displacement of the aircraft simulator to a point 28 will cause the visual system to alter the apparent perspective of the image such that the viewpoint of the operator will be located at a point 30. The ratio of the distance $d_1$ to $d_2$ will be equal to the ratio of the diameter of the envelope 16 to the length of the major axis of the envelope 18.

If a simulated change in displacement is made from the point 24 to the point 28 and the viewpoint of the operator is changed from the point 24 to the point 30 and the perspective of the image is altered accordingly, the operator of the simulator will not recognize the disparity between the simulated displacement of the simulator and the visual displacement from the point 24 if no readily discernible objects are contained within the scenes being presented to the operator.

Figure 3:
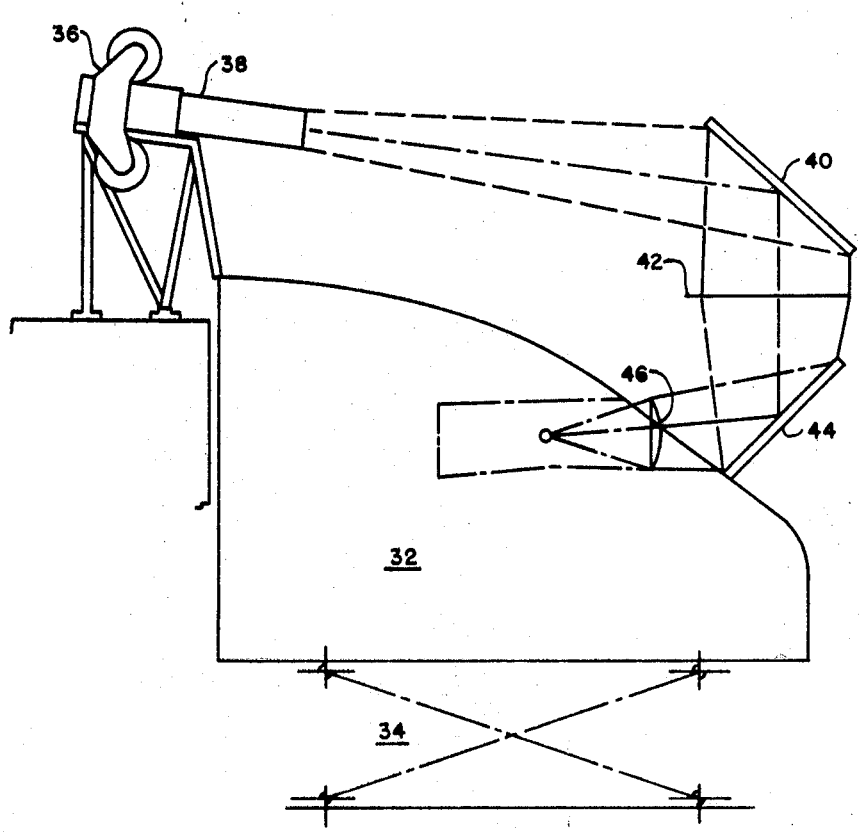
FIG. 3 is a side elevational and diagrammatic view of a simulator with an associated visual system mounted thereon.

A typical aircraft simulator which may be employed in conjunction with the present invention is illustrated in FIG. 3 as including a cockpit 32 which is mounted on a motion system generally designated with the referenced numeral 34. A projector 36 displays the scenes recorded on the film which were photographed from the airplane 10 following the flight path 12. An optical system 38 provides the necessary alteration in the apparent perspective of the image in accordance with the position of the controls as operated by the student pilot within the cockpit 32. The projected image is displayed to the student pilot by means of a mirror 40, a rear projection screen 42, a mirror 44, and a lens 46.

The optical system 38 for altering the apparent perspective of the image of the scenes recorded on the film is illustrated in FIG. 4. As shown, the optical system 38 includes a first group of optical elements or lenses designated with the reference numeral 48, which form an image rotator and a zoom lens combination. A group of lenses designated with the reference numeral 50 form a variable magnification, variable focal length or zoom lens combination for varying the size of the projected image. A Pechan prism 52 is disposed in front of the zoom lens 50 and permits rotation of the image. A fine focus for the system is provided by a group of lenses 54.

Immediately following the first section 48 is a group of lenses 56 which form an anamorphic lens group. Each of the lenses within the group 56 are fixed relative to one another and the entire group is mounted for rotation about the optical axis thereof. Another anamorphic group of lenses 58 is mounted for rotation on the optical axis of the optical system 38 in tandem with the lenses 56. A pair of pitch wedges 60 and 62 are disposed adjacent to the anamorphic group of lenses 58 and on the optical axis of the optical system 38, and produce a vertical shifting of the image passing therethrough.

A decollimating lens group 64 forms the final group of lenses in the optical system 38.

If it is decided to project an image through the opjtical system 38 without any distortion therein, the magnification axes of the anamorphic lenses 56 and 58 are disposed orthogonally to one another. If a one-to-one magnification is desired, the zoom lens 50 is conditioned to provide a reduction in the size of the image equal to the amount of enlargement produced by the two anamorphic lenses 56 and 58 on the image. In order to produce various effects of motion or changes in viewpoint, various elements of the optical system 38 are either translated or rotated accordingly.

In order to providet he effect of a simulated change in heading, the projector 36 is translated laterally as indicated by the double-headed arrow designated with the reference numeral 66 in FIG. 5. To provide the effect of a simulated change in the pitch of the aircraft, the pitch wedges 60 and 62 are rotated in opposite directions with respect to one another to shift the entire image vertically. To provide the effect of roll, the image rotater Pechan prism 52 is rotated.

To provide the visual effect of movement along the flight path 12 within the envelope 16 without any horizontal or vertical excursion, the film having the scenes recorded thereon is operated in either a forward or a reverse direction to simulate forward or reverse motion respectively. Changes in the speed along the flight path 12 are simulated by changing the speed of the film. In order to provide the visual effect of horizontal, vertical, or a combination of horizontal and vertical excursion within the envelope 16, the magnification axes of the anamorphic lenses 56 and 58 must be rotationally positioned in accordance with a predetermined relationship. In addition, because of the rotation of the image produced by the anamorphic lenses 56 and 58, the Pechan prism 52 must be rotated to maintain all horizontal lines in the image parallel to the horizon. Since the total magnification produced by the anamorphic lenses 56 and 58 changes with the changes in position of those lenses, the zoom lens 50 must be conditioned to compensate for that change in magnification.

Accordingly, the optical system illustrated in FIGS. 4 and 5 alters the apparent perspective of an image by the steps of providing two primitive transformations by means of the two anamorphic lenses, one spherical magnification by means of the zoom lens, and rotation of the image by means of the Pechan prism 52. The position of the anamorphic lens 56 is defined by the value of the angle $\beta$, which is the angle between the magnification axis of the anamorphic lens and a vertical line. The position of the anamorphic lens 58 is defined by an angle $\theta$, which is the angle between the magnification axis of the anamorphic lens 58 and the magnification axis of the lens 56.

FIG. 6 is a graphical illustration of the values of $\beta$ and $\theta$ which will provide the change in the apparent perspective of an image transmitted through the optical system 38 illustrated in FIGS. 4 and 5. The families of the curves shown in FIG. 6 are bounded by an envelope which is defined by the value $\theta$ equal to zero degrees. This envelope corresponds approximately to the envelope 16 illustrated in FIGS. 1 and 2, which is the maximum possible excursion offered by the visual system in the alteration of the apparent perspective of an image.

In FIG. 6, the abscissa represents the lateral displacement $d$ and the ordinate represents vertical displacement $h$, each measured in the plane of the original viewpoint. The point $P_1$ represents the viewpoint of the undistorted image of the scenes taken from the camera airplane 10. In addition to the values of $\beta$ and $\theta$, FIG. 6 contains the family of curves of the rotation $p$ of the Pechan prism 52. The magnifications $m_1$ of the anamorphic lens 56 and $m_2$ of the anamorphic lens 58 are indicated in FIG. 6 as being equal to the value two.

Assume that an image of an area represents a scene as viewed from an original viewpoint located at an altitude of 5 units and no lateral displacement, and that it is desired to provide an image of that area such as would be seen from a desired viewpoint at the same altitude and laterally displaced from the initial viewpoint a distance equal to approximately 3.8 units; or as shown in FIG. 6, that it is desired to alter an image taken at point $P_1$ to be in true perspective as viewed from a point $P_2$. FIG. 6 shows that the $\beta$ anamorphic lens 56 should be adjusted to a $\beta$ angle of approximately $+8°$, the $\theta$ anamorphic lens 58 should be adjusted to a $\theta$ angle of 60°, the spherical magnification $P^0$ of the zoom lens 50 should be 0.5, and that a counter-rotation angle $\rho$ of the Pechan prism 52 should be approximately $+15°$.

If, on the other hand, the envelope of the optical system is expanded twofold, and the controls of the simulator are operated to effect a simulated displacement of the simulator to the point $P_2$, the apparent perspective of the scene presented to the student will have a true perspective as viewed from a point $P_3$. As a result, the controls of the simulator can be operated to effect a simulated change in displacement which is two times greater than the maximum deviation permitted by the optical system, if the envelope of the optical system is expanded twofold. As shown in FIG. 6, if it is desired to alter an image taken at point $P_1$ to be in true perspective as viewed from the point $P_3$, the $\beta$ anamorphic lens 56 should be adjusted to a $\beta$ angle of approximately $+4°$, the $\theta$ anamorphic lens 58 should be adjusted to a $\theta$ angle of 75 degrees, the spherical magnification $P_0$ of the zoom lens 50 should be 0.5, and that a counter rotation angle $\rho$ of the Pechan prism 52 should be approximately $+8°$.

Figure 7:
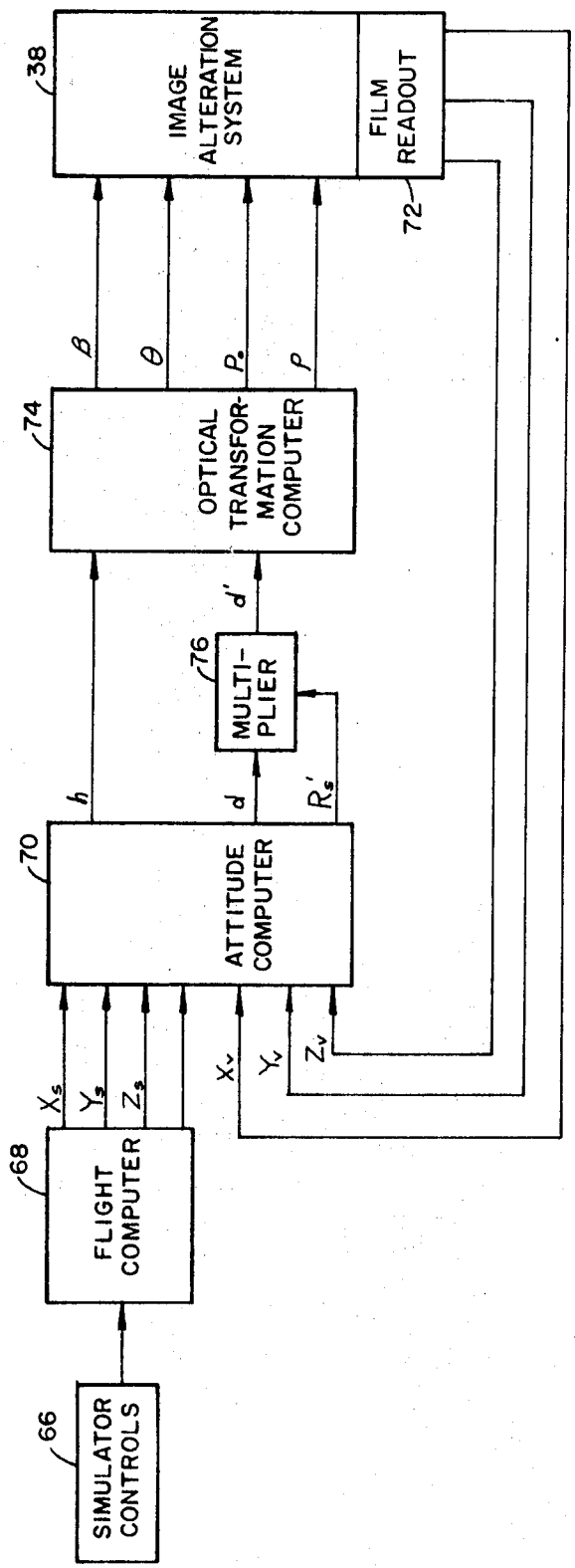
FIG. 7 is a block diagram of a control system for positioning the elements of the optical system illustrated in FIG. 4 and constructed in accordance with the principles of the present invention.

A system for computing the quantities which are required for positioning the elements of the optical system 38 is illustrated in FIG. 7. As shown therein, signals which are indicative of forces applied to the aircraft simulator 32 are supplied from the controls 66 thereof to a flight computer 69 which continually computes the simulated position along three orthogonal axes of the simulator. The signals from the flight computer are supplied to an attitude computer 70 which also receives signals from a film readout 72, which signals are indicative of the position of the scene recorded on the film. The attitude computer 70 computes the quantities $d$ and $h$ (which are plotted on the abscissa and on the ordinate respectively of the graph illustrated in FIG. 6) and supplies such computed quantities to an optical transformation computer 74 which derives the quantities for positioning the elements of the optical system 38.

Considering the computer illustrated in FIG. 7 in greater detail, quantities commensurate with forces applied to an aircraft which is being simulated are generated by the controls 66. These quantities are generated in accordance with operation of the controls by the student and in accordance with previously computed quantities, such as altitude and airspeed. The computed quantities commensurate with forces developed on the aircraft which is being simulated are supplied in the form of signals to the flight computer 68 which performs a double integration of such signals to develop quantities commensurate with the simulated position along three orthogonal coordinate axes of the aircraft as indicated by the quantities $X_s$, $Y_s$ and $Z_s$ shown in FIG. 7.

When the film, which contains the scenes to be displayed to the student is processed, information relative to the position of the camera which photographed the film is recorded thereon and is read out by means of the film readout 72 and supplied in the form of signals $X_v$, $Y_v$ and $Z_v$ to the attitude computer 70. The attitude computer 70 computes the quantities $d$ and $h$, which quantites are employed in the computation of the quantities $\beta$, $\theta$, $P_0$ and $\rho$.

Figure 8:
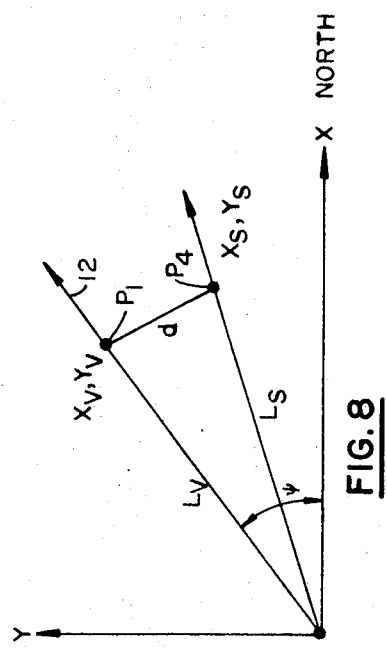
FIG. 8 is a graphical illustration of the visually recorded flight path and the simulated position of the aircraft simulator with respect to a coordinate reference.

The function of the attitude computer 70 can be better understood from the graphical illustration of the visually recorded flight path and the simulated position of the aircraft simulator with respect to a coordinate reference illustrated in FIG. 8. As shown therein, each point of the flight path 12 can be defined in terms of respective coordinates X and Y, with the origin of the coordinate axes X and Y defining a fixed starting point for the particular sequence of scenes recorded on the film and for the aircraft simulator. For instance, in a typical approach to a landing strip, the origin of the coordinate axes X and Y is usually defined as the outer marker for that particular landing strip. As shown in FIG. 8, the position of the point $P_1$ is defined in terms of coordinates $X_v$ and $Y_v$. The distance from the origin to the point $P_1$ is defined as $L_v$. If a lateral excursion is made from the point $P_1$ to the point $P_4$ which is defined by the coordinates $X_s$ and $Y_s$, the lateral displacement $d$ will be defined as:

$$d = (L_s^2 - L_v^2)^{\frac{1}{2}} \qquad (1)$$

The distance from the origin to the point $P_4$ is defined as:

$$L_s = (X_s^2 + Y_s^2)^{\frac{1}{2}} \qquad (2)$$

In a like manner, the distance to the point $P_1$ from the origin is defined as:

$$L_v = (X_v^2 + Y_v^2)^{\frac{1}{2}} \qquad (3)$$

From expressions 1, 2 and 3 above, the lateral displacement of the assumed position of the simulator from the flight path 12 is defined as:

$$d = (X_s^2 - X_v^2 + Y_s^2 - Y_v^2)^{\frac{1}{2}} \qquad (4)$$

The attitude computer 70 also computes the vertical displacement between the assumed position of the simulator and the position at the point at which the particular scene on the film was recorded. This vertical displacement is defined as:

$$h = Z_s - Z_v \qquad (5)$$

In addition, and in accordance with one form of the present invention, the quantity corresponding to the lateral displacement is divided by a factor corresponding with the assumed range of the simulator from the target. As shown in FIG. 7, the quantity $d$ is supplied from the attitude computer 70 to a multiplier 76 which multiplies that quantity by the reciprocal of a quantity $R_s'$ to provide an output $d'$ to the transformation computer 74. The quantity by the reciprocal of a quantity $R_s'$ to provide from the target within prescribed limits. That is, the value of the quantity $R_s'$ is equal to the assumed range of the simulator up to particular value, beyond which the value of $R_s'$ is limited. The output of the multiplier 76 is supplied to the transformation computer 74 to increase the envelope of the optical system 38. Since the distance $R_t$ from the origin of the X, Y axes to the target is known, the assumed range of the simulator can be computed in accordance with that range and from the above derived expressions. In particular, the assumed range of the simulator is defined as:

$$R_s = [(R_t - L_v)^2 + d^2 + h^2]^{1/2} \quad (6)$$

Figure 9:
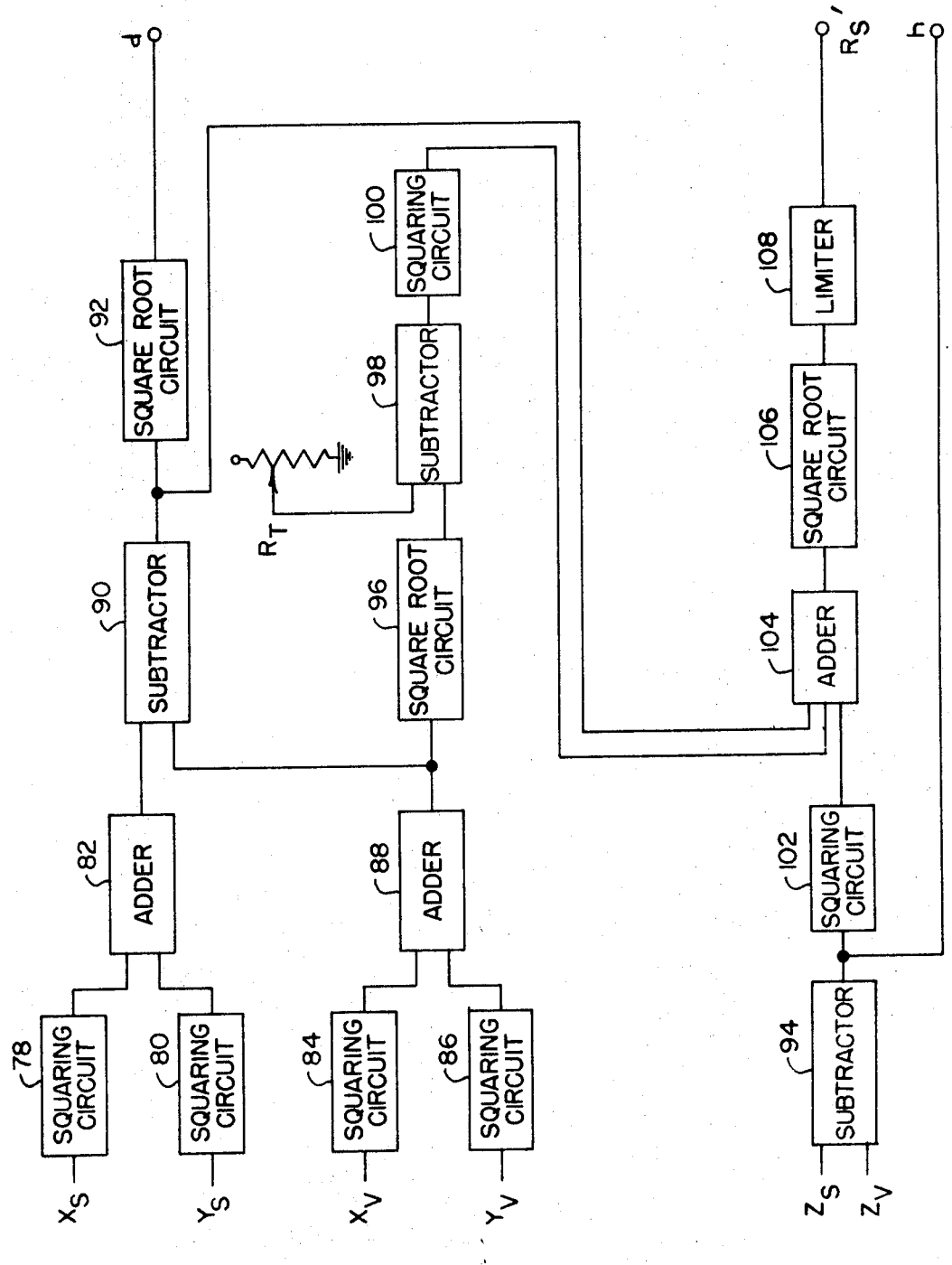
FIG. 9 is a block diagram of the attitude computer illustrated in FIG. 7.

One form of the attitude computer 70 illustrated in FIG. 7 is shown in block diagram form in FIG. 9. As shown therein, the quantities $X_s$ and $Y_s$ are squared by respective squaring circuits 78 and 80 and the respective squared quantities are added to one another in an adder 82 to provide the quantity $L_s^2$. In a like manner, the quantities $X_v$ and $Y_v$ are squared by respective squaring circuits 84 and 86 and the squared quantities are added in an adder 88 to provide the quantity $L_v^2$. The output of the adder 88 is subtracted from the output of the adder 82 in a subtractor 90 and the output therefrom is supplied to a square root circuit 92 to develop the quantity $d$. The quantities $Z_s$ and $Z_v$ are supplied to a subtractor 94 to develop the quantity $h$ in accordance with expression 5. The assumed range of the simulator is computed by first supplying the output of the adder 88 to a square root circuit 96 to produce the quantity $L_v$. The quantity $R_t$, which is the distance from the origin of the X, Y coordinates to the target and which is known for each simulated flight, is supplied to one input of a subtractor 98 having the other input thereof connected to an output of the square root circuit 96. The subtractor 98 subtracts the quantity $L_v$ from the quantity $R_t$ and supplies the resultant quantity to a squaring circuit 100.

The output of the subtractor unit 94 is squared by a squaring circuit 102. An output from the subtractor 90 which is the quantity $d^2$, the output of the squarer 100, and the output of the squaring circuit 102 are supplied to an adder circuit 104. The output of the adder circuit 104 is supplied to a square root circuit 106 and the resultant quantity is equal to $R_s$. The quantity $R_s$ is connected to a limiter circuit 108 which limits the maximum value of the quantity $R_s$, which limited quantity is designated $R_s'$ and is supplied to the multiplier 76 illustrated in FIG. 7. It is to be understood, of course, that the computations performed by the circuit illustrated in FIG. 9 can be performed by other well known computer techniques.

In the above described embodiment of the present invention, the envelope of the visual system is expanded in accordance with the computed range of the simulator from the target, within prescribed limits of the value of that range. Since the sequence of recorded scenes begins at a known range from the target, the quantity $R_s'$ which is commensurate with the range within prescribed limits is computed and employed to control the expansion of the visual system envelope. However, it is also desirable in certain types of simulated missions to program the expansion of the visual envelope. For instance, in a simulated mission which presents to the student a plurality of scenes having several more discernible objects at spaced distances within the sequence of scenes, it is more desirable to program the expansion of the visual envelope such that the envelope will be expanded during simulated flight between the objects and reduced to its actual size during simulated flight in the immediate vicinity of the objects.

Figure 10:
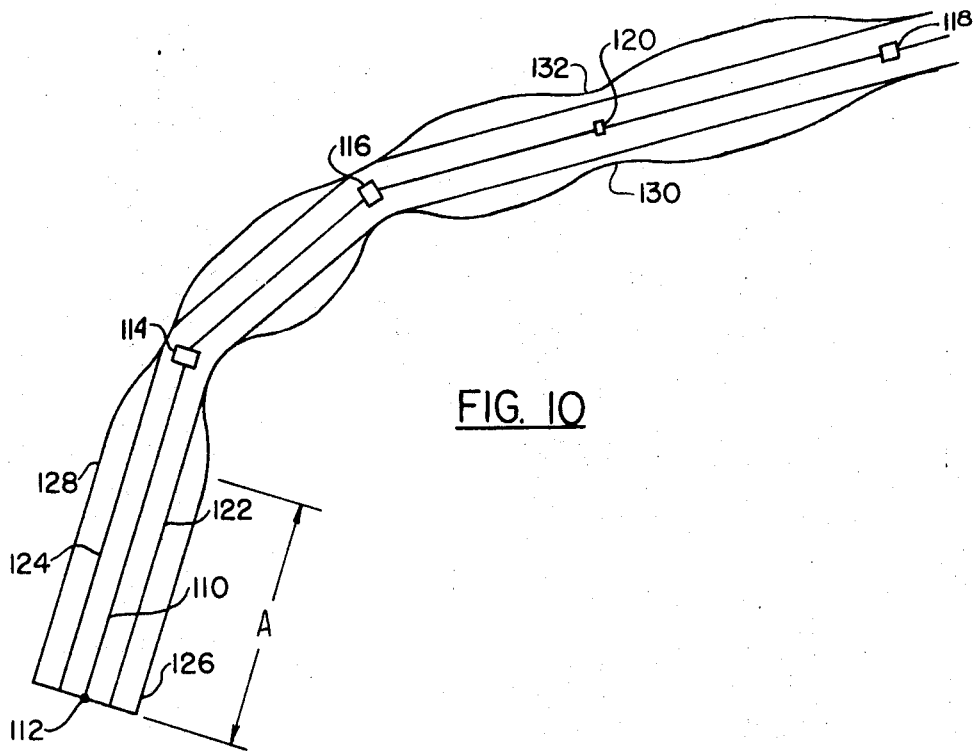
FIG. 10 is a diagrammatic representation of a simulated flight path and the associated envelope of the visual system employed in displaying the recorded scenes of that flight path.

The flight path of a particular simulated mission which presents to the student a plurality of scenes having several more discernible objects at spaced distances is illustrated in FIG. 10. As shown therein, a flight path 110 extends in a straight line from a point 112 to a first target 114, alters direction in the immediate vicinity of the target 114 and proceeds along a straight line to a second target 116, again alters direction and proceeds along another straight line toward a third target 118. As shown in FIG. 10, the flight path 110 between the targets 116 and 118 passes over a cultural object 120. It is further intended to show in FIG. 10 that the flight path 110, with the exception of the targets 114, 116 and 118 and the object 120 passes over a terrain which does not contain any readily discernible objects. The envelope of the visual system 38 is defined by the lines 122 and 124 spaced an equal distance from one another along the entire flight path. In accordance with the present invention, the envelope of the visual system is expanded during that portion of the flight mission in which no discernible objects are viewed by the student. In particular, the envelope of the visual system is expanded to the limits defined by lines 126 and 128.

As shown in FIG. 10, the lines 126 and 128 converge toward the lines 122 and 124, respectively, as the target 114 is being approached in the simulated mission. It is assumed, for example, that the target 114 does not appear in any of the scenes being viewed by the student, the lines 126 and 128 will be a parallel with one another along a distance designated A in the simulated flight path. If at the end of the distance A subsequent scenes presented to the student contain the target 114 therein, the lines 126 and 128 will converge toward the lines 122 and 124, respectively, until the expanded envelope of the visual system is reduced to its actual size. After the simulated flight path 110 has passed over the target 114 and the image of the target 114 is no longer presented to the student, the envelope of the visual system is again expanded. However, after the image of the target 114 is no longer presented to the student, the envelope of the visual system can be expanded rather rapidly as compared to the reduction of the expanded envelope during the time that the image of the target 114 appears in these scenes being presented to the student.

After the envelope of the visual system is expanded to the fullest extent thereof after the target 114 has been passed in the simulated flight path, the appearance of the target 116 in the scenes presented to the student will again require reduction of the expanded envelope to its actual size. If a relatively small cultural object appears in the scenes being presented to the student, it may not be necessary to reduce the expanded envelope of the visual system completely to its actual size. For instance, if the object 120 is a relatively small object of relatively minor significance to the pilot of an aircraft flying thereover, the expanded envelope of the visual system is reduced only slightly as shown by the concave portions 130 and 132 in the otherwise parallel lines 126 and 128.

Figure 11:
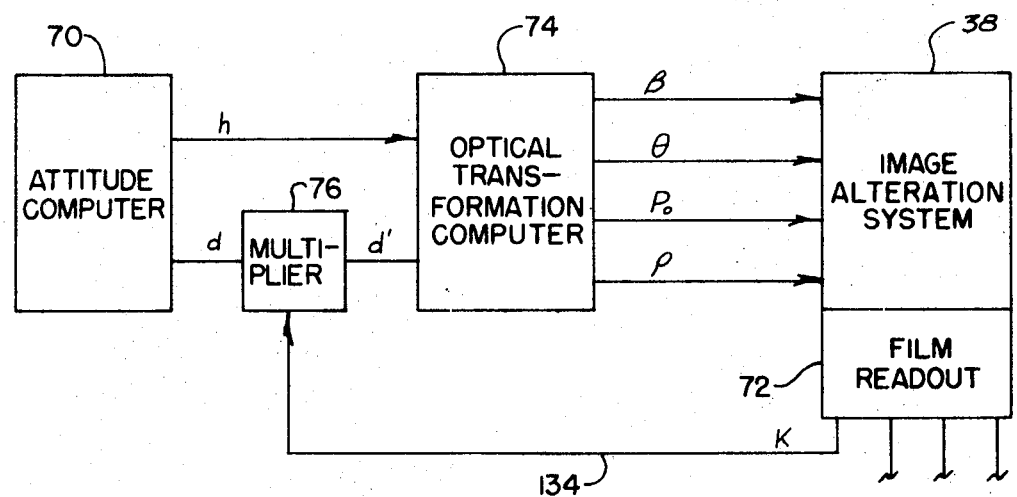
FIG. 11 is a block diagram of a portion of the system illustrated in FIG. 7 showing an alternate form of the present invention.

FIG. 11 is a block diagram of a portion of the system illustrated in FIG. 7 and modified to provide complete programming of the expansion of the visual system envelope. As illustrated therein, the quantity $d$ is multiplied by a factor, the value of which is programmed on the film containing the recorded scenes and read out by the film readout 72 on a line 134. The programmed factor on the line 134 is supplied to the multiplier 76 to effect a multiplication of the quantity $d$ to produce the quantity $d'$. Recording such a factor on a film is a well known practice in the art. For example, such a quantity can be recorded on the sound track of a motion picture film which may be either optical or magnetic.

The principles of the present invention explained in connection with the specific exemplifications thereof as described hereinabove and illustrated in the accompanying drawings will suggest many other applications and modifications of the same. It is accordingly desired that, in construing the breadth of the appended claims, they shall not be limited to the specific details shown and described in connection with the disclosed exemplifications of the present invention.

The invention claimed is:

1. An improvement for a visual system for altering the apparent perspective of an image which is to be viewed by an operator of an associated vehicle simulator to visually simulate the excursion over a prescribed path, which simulated excusion is defined by the operation of controls of the simulator, and in which the alteration of the image is bounded within prescribed limits, comprising means responsive to a plurality of computed quantities which defined the simulated position of the simulator with respect to a coordinate reference for generating quantities in the form of signals which define the simulated position within said prescribed limits, and means for multiplying one of said signals by a factor to alter the limits of the image alteration.

2. The invention according to claim 1 and further comprising means responsive to the plurality of computed quantities which define the simulated position of the simulator with respect to the coordinate reference for generating said factor.

3. The invention according to claim 2, wherein said factor is equal to the apparent range of the simulator with respect to the origin of the coordinate reference.

4. The invention according to claim 2, wherein said factor is equal to the inverse of the apparent range of the simulator with respect to a defined point in the coordinate reference.

5. The invention according to claim 1, further comprising means for storing and providing at an output thereof a range signal commensurate with the apparent range of a discernible object in a sequence of images including the viewed image, and means connecting said range signal to said multiplying means to define said factor therein.

6. A visual system comprising means for sequentially displaying a plurality of recorded scenes including means for altering the apparent perspective of an image of the scenes from an original viewpoint to a desired viewpoint, means for generating a signal proportional to the displacement from the original viewpoint to the desired viewpoint, means for multiplying said signal by a factor commensurate with the apparent range of a discernible object recorded in at least a number of the scenes, which number is less than the total number of the scenes, and means connecting the multiplied signal to the altering means to effect an alteration of the apparent perspective of the image to a viewpoint which is displaced less than the desired viewpoint from the original viewpoint.

7. A visual system comprising means for sequentially displaying a plurality of recorded scenes including means for altering the apparent perspective of an image of the scenes from an original viewpoint to a desired viewpoint, means responsive to a first plurality of signals which defined the coordinates of the desired viewpoint and to a second plurality of signals which define the coordinates of the original viewpoint in a coordinate reference for generating a displacement signal which defines the displacement from the original viewpoint to the desired viewpoint, means for multiplying said displacement signal by a predetermined factor, and means connecting the multiplied signal to the altering means to effect an alteration of the apparent perspective of the image to a viewpoint which is displaced less than the desired viewpoint from the original image by an amount which is proportional to said predetermined factor.

8. The invention according to claim 7 and further comprising means responsive to said first plurality of signals and to said second plurality of signals for generating a range signal which defines the apparent range of a discernible object recorded in at least a number of the scenes, which number is less than the total number of the scenes, and means connecting said range signal to said multiplying means to define said predetermined factor.

References Cited
UNITED STATES PATENTS
3,233,508    2/1966    Hemstreet _____ 352—85

RODNEY BENNETT, Primary Examiner

S. BUCZINSKI, Assistant Examiner

U.S. Cl. X.R.

352—85; 353—12